US009325897B2

(12) United States Patent
Hirose

(10) Patent No.: US 9,325,897 B2
(45) Date of Patent: Apr. 26, 2016

(54) IMAGE CAPTURE APPARATUS WITH AUTOMATIC FOCUS DETECTION AND METHOD FOR CONTROLLING THE SAME

(71) Applicant: CANON KABUSHIKI KAISHA, Tokyo (JP)

(72) Inventor: Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/293,533

(22) Filed: Jun. 2, 2014

(65) Prior Publication Data

US 2014/0362276 A1 Dec. 11, 2014

(30) Foreign Application Priority Data

Jun. 5, 2013 (JP) .................................. 2013-119212

(51) Int. Cl.
*H04N 5/232* (2006.01)
*H04N 5/228* (2006.01)
*H04N 5/369* (2011.01)

(52) U.S. Cl.
CPC ......... *H04N 5/23212* (2013.01); *H04N 5/3696* (2013.01)

(58) Field of Classification Search
CPC ................................................ H04N 5/23212
USPC ................................................. 348/345–375
See application file for complete search history.

(56) References Cited

U.S. PATENT DOCUMENTS

| 7,602,435 | B2* | 10/2009 | Ishii | H04N 5/232 |
| | | | | 348/345 |
| 2006/0133792 | A1* | 6/2006 | Ide | G03B 13/32 |
| | | | | 396/111 |
| 2011/0102663 | A1* | 5/2011 | Ichimiya | G02B 7/36 |
| | | | | 348/345 |
| 2011/0164169 | A1* | 7/2011 | Yamasaki | G02B 7/34 |
| | | | | 348/345 |
| 2011/0273608 | A1* | 11/2011 | Tsukada | G02B 7/36 |
| | | | | 348/345 |
| 2012/0262604 | A1* | 10/2012 | Ishii | H04N 5/23212 |
| | | | | 348/231.99 |
| 2014/0118610 | A1* | 5/2014 | Ohara | H04N 5/23212 |
| | | | | 348/349 |
| 2015/0009352 | A1* | 1/2015 | Shibagami | H04N 5/23212 |
| | | | | 348/218.1 |

FOREIGN PATENT DOCUMENTS

JP 2000-292686 A 10/2000
JP 2008-085738 A 4/2008

* cited by examiner

*Primary Examiner* — Sinh Tran
*Assistant Examiner* — Selam Gebriel
(74) *Attorney, Agent, or Firm* — Cowan, Liebowitz & Latman, P.C.

(57) ABSTRACT

A defocus amount is corrected according to the difference between the focus state of an imaging optical system that corresponds to the accumulation period of multiple image signals used to generate an added image signal and the focus state of the imaging optical system when the focal point is adjusted. Here, when calculating the focus state of the imaging optical system that corresponds to the accumulation period of the image signals used to generate the added image signal, the focus state of the imaging optical system that corresponds to the accumulation period of an image signal used to generate the added image signal is weighted higher the higher the sharpness of that image signal is.

16 Claims, 14 Drawing Sheets

PLAN VIEW             A-A CROSS-SECTIONAL VIEW

FIG. 4B
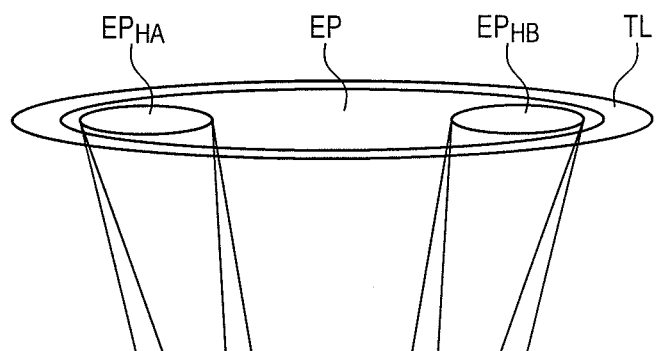
FIG. 4A
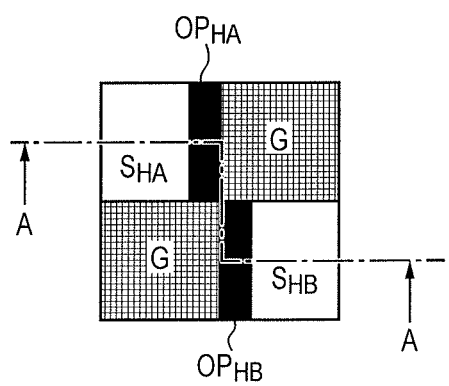
PLAN VIEW
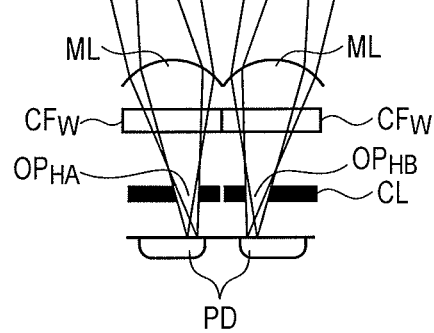
A-A CROSS-SECTIONAL VIEW

PLAN VIEW

A-A CROSS-SECTIONAL VIEW

F I G. 8

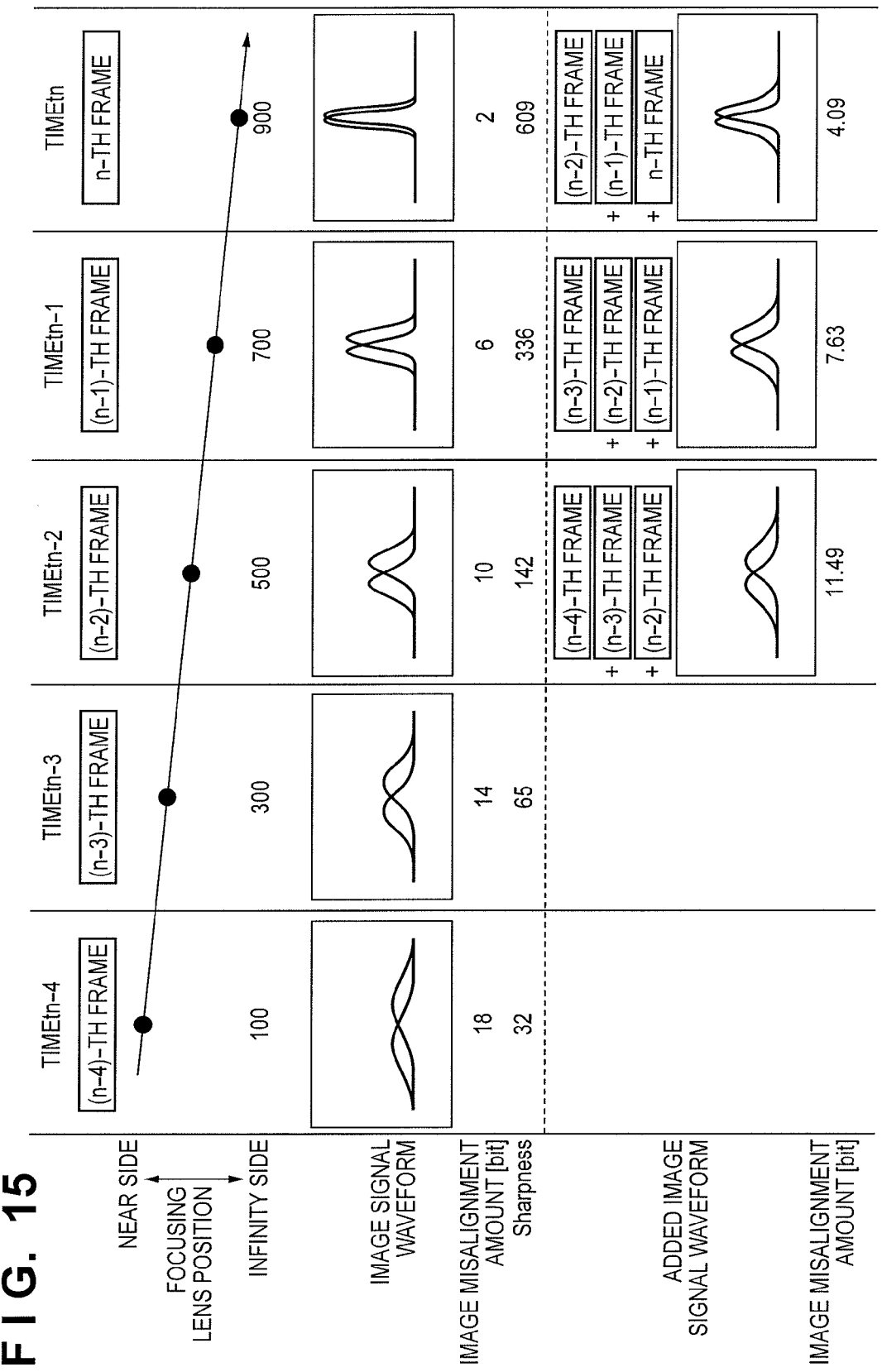

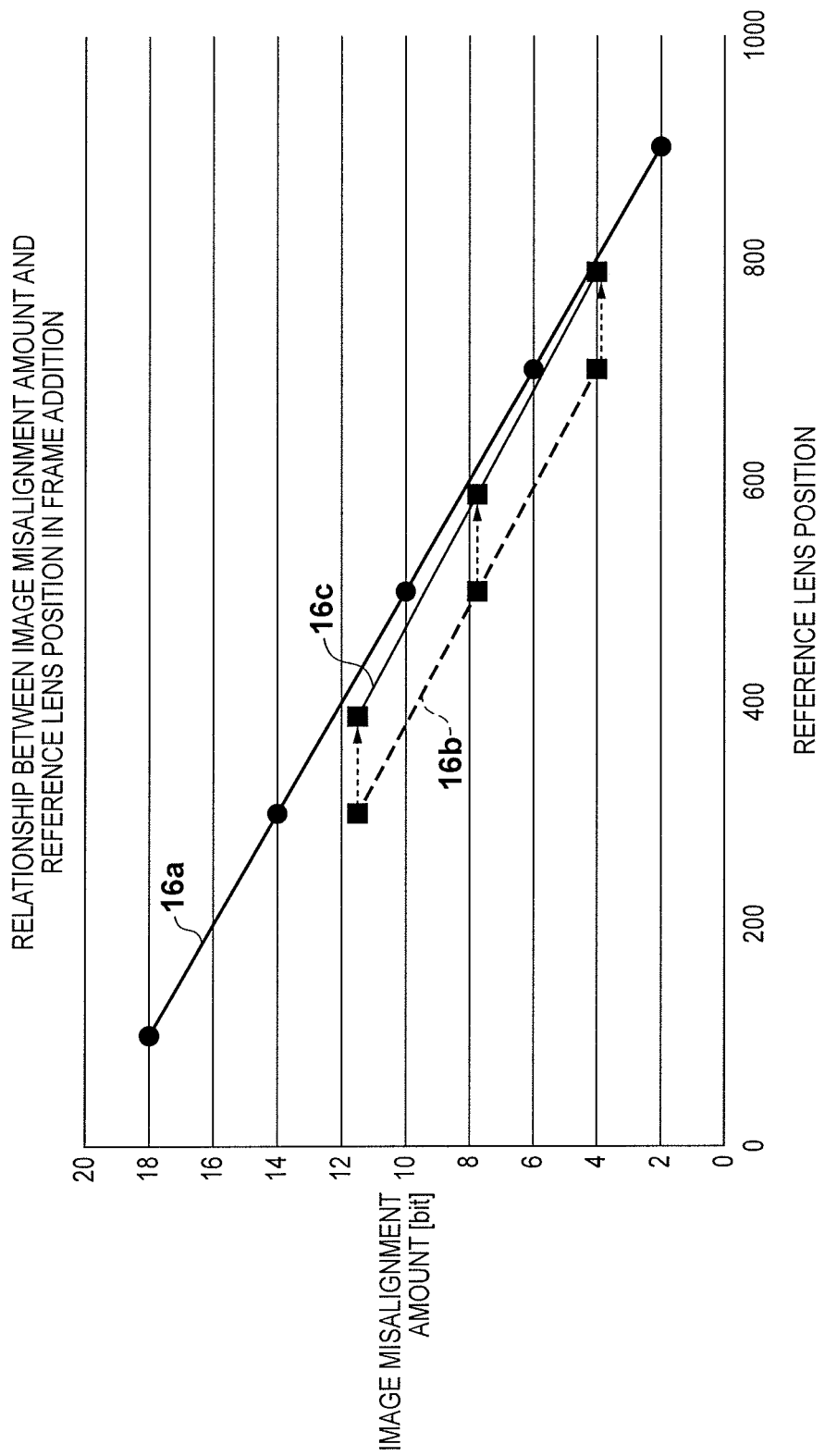

IMAGE CAPTURE APPARATUS WITH AUTOMATIC FOCUS DETECTION AND METHOD FOR CONTROLLING THE SAME

BACKGROUND OF THE INVENTION

1. Field of the Invention

The present invention relates to an image capture apparatus and a method of controlling the same, and in particular relates to an automatic focus detection technique.

2. Description of the Related Art

As a technique for realizing automatic focus detection (AF) that employs a phase-difference detection method using signals obtained from an image sensor, there is known to be a technique of giving a specific function to some of the pixels arranged in the image sensor. For example, Japanese Patent Laid-Open No. 2000-292686 discloses an image sensor in which pixels for focus-detection, which have been given a pupil-dividing function by arranging the light-receiving area so as to be shifted relative to the optical axis of the on-chip microlens, are arranged inside the pixel region at a predetermined interval. Using this type of image sensor makes it possible to perform focus detection employing a phase-difference detection method based on a pair of signals obtained from pixels for focus-detection that have different pupil division directions.

Meanwhile, image capture apparatuses of recent years have employed a method suited to signal application when reading out signals from the pixels of an image sensor. For example, in the case of performing live-view display, since the resolution of the display apparatus is lower than the pixel count of the image sensor, a signal corresponding to a pixel count suited to this display is obtained by adding up multiple pixels during readout or thinning out pixels during readout. When recording a moving image as well, images having a moving image resolution are acquired in a similar manner. Capturing and recording a moving image for live-view display differs from still image recording in that there is desire for a high frame rate since the smoothness of the display is more important than the resolution.

However, if the frame rate is raised, the exposure time per frame decreases. It is therefore difficult to maintain precision in automatic focus detection that uses signals obtained from pixels for focus-detection, particularly in the case of a low-brightness subject. In order to address this issue, Japanese Patent Laid-Open No. 2008-085738 proposes a method of adding up multiple frames worth of signals obtained from the pixels for focus-detection when performing focus detection.

However, Japanese Patent Laid-Open No. 2008-085738 does not disclose how focus detection is performed in the case of driving the focusing lens during moving image capture. If the subject image changes due to the driving of the focusing lens, the change in the subject image will influence the image misalignment amount of the added-up image signals. For this reason, there are cases where the in-focus position is not reached even when performing relative driving of the focusing lens based on the focal position at the center time of the accumulation period of the added-up frames.

SUMMARY OF THE INVENTION

The present invention has been achieved in light of these issues in conventional technology. The present invention improves the focus detection precision in the case where the focusing lens position changes between added-up frames in an image capture apparatus that performs focus detection that employs a phase-difference detection method using signals obtained by adding up the signals of multiple frames, and a method of controlling the same.

According to one aspect of the present invention, there is provided an image capture apparatus comprising: an image sensor that can acquire image signals to be used for focus detection based on a phase-difference detection; an addition unit configured to generate an added image signal by adding a plurality of image signals obtained in a plurality of frames of a moving image captured at a predetermined frame rate; a calculation unit configured to calculate a defocus amount of an imaging optical system based on the added image signal; a correction unit configured to correct the defocus amount; and a drive unit configured to adjust a focal point of the imaging optical system according to the corrected defocus amount, wherein the correction unit corrects the defocus amount according to a difference between a focus state of the imaging optical system that corresponds to an accumulation period of the plurality of image signals used to generate the added image signal and a focus state of the imaging optical system when the drive unit adjusts the focal point.

According to another aspect of the present invention, there is provided a method of controlling an image capture apparatus that has an image sensor that can acquire an image signal using focus detection that employs a phase-difference detection method, comprising the steps of: generating an added image signal by adding a plurality of image signals obtained in a plurality of frames of a moving image captured at a predetermined frame rate; calculating a defocus amount of an imaging optical system based on the added image signal; correcting the defocus amount; and adjusting a focal point of the imaging optical system according to the corrected defocus amount, wherein in the correction step, the defocus amount is corrected according to a difference between a focus state of the imaging optical system that corresponds to an accumulation period of the plurality of image signals used to generate the added image signal and a focus state of the imaging optical system when the focal point is adjusted in the adjusting step.

Further features of the present invention will become apparent from the following description of exemplary embodiments with reference to the attached drawings.

BRIEF DESCRIPTION OF THE DRAWINGS

FIGS. 4A and 4B are diagrams showing an example of an arrangement and a structure of pixels for focus-detection of the image sensor that perform pupil division in the horizontal direction (lateral direction) of the lens, according to the embodiment.

FIG. 8 is a diagram showing an example of an arrangement of pixels for imaging and pixels for focus-detection of the image sensor according to the embodiment.

FIG. 15 is a diagram for describing frame addition and image signals according to the embodiment.

FIG. 16 is a diagram showing a relationship between the image misalignment amount and the reference lens position during frame addition according to the embodiment.

DESCRIPTION OF THE EMBODIMENTS

Exemplary embodiments of the present invention will now be described in detail in accordance with the accompanying drawings.

Figure 1:
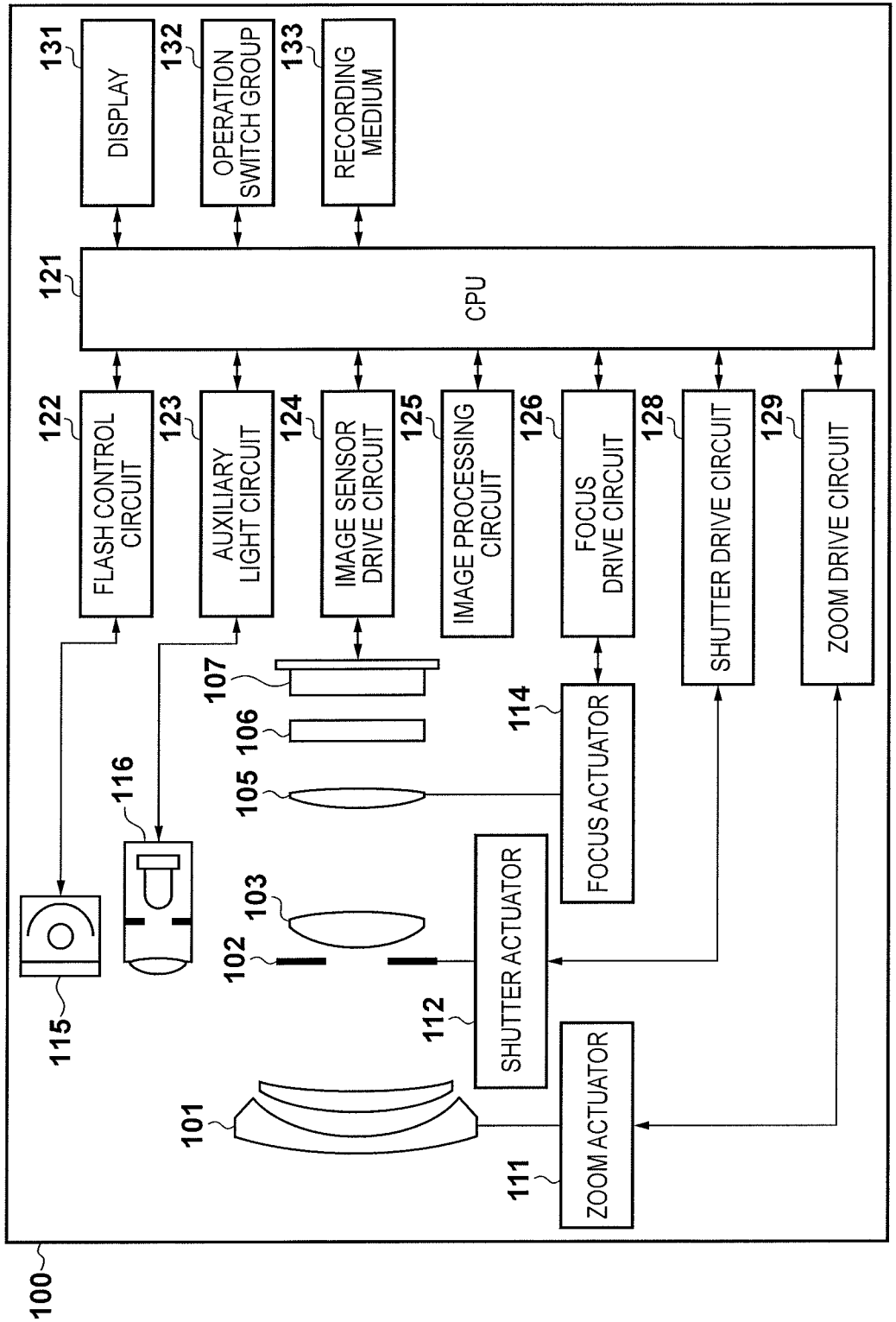
FIG. 1 is a diagram showing an example of a functional configuration of a digital still camera as one example of an image capture apparatus according to an embodiment of the present invention.

FIG. 1 is a diagram showing an example of the functional configuration of a digital still camera 100 (referred to hereinafter as simply the "camera 100") as one example of an image capture apparatus according to an embodiment of the present invention.

A first lens group 101 is arranged at the head of an imaging optical system (image forming optics system), and is held so as to be capable of moving forward and rearward along the optical axis. A shutter 102 functions not only as a shutter for controlling the exposure time during still image capture, but also as a diaphragm for performing light quantity adjustment during image capture by adjusting the opening diameter. A second lens group 103 arranged behind the shutter 102 (on the image sensor side thereof) is capable of moving forward and rearward along the optical axis integrally with the shutter 102, and realizes a zoom function along with the first lens group 101.

A third lens group 105 is a focusing lens that is capable of moving forward and rearward along the optical axis. The third lens group 105 will be referred to as the focusing lens hereinafter. The focal position of the imaging optical system is adjusted using the position of the focusing lens 105. Accordingly, information regarding the position of the focusing lens (e.g., the pulse count position) is information indicating the focus state of the imaging optical system. Information regarding the position of the focusing lens 105 can be acquired by a CPU 121 via a focusing drive circuit 126. An optical low pass filter 106 is arranged in front of an image sensor 107 and reduces false color and moiré in the captured image. The image sensor 107 is constituted by a two-dimensional CMOS image sensor and peripheral circuitry thereof. In the present embodiment, the image sensor 107 is a two-dimensional single-plate color image sensor in which multiple light receiving elements are arranged in a two-dimensional array with m pixels laterally and n pixels longitudinally, on which a primary-color color mosaic filter with the Bayer pattern is formed on-chip. The wavelength of transmitted light that is to be incident on the light receiving elements is limited by the color filter in units of pixels.

A zoom actuator 111 realizes a zoom (magnification) function by, under control of a zooming drive circuit 129, rotating a cam barrel (not shown) so as to drive at least one of the first lens group 101 and the third lens group 105 along the optical axis. Under control of a shutter drive circuit 128, a shutter actuator 112 controls the opening size of the shutter 102 so as to adjust the amount of light in imaging and control the exposure time during still image capture.

A focus actuator 114 drives the third lens group 105 along the optical axis under control of the focusing drive circuit 126.

A flash 115 can be a flash illumination apparatus that uses a xenon tube, but may be an illumination apparatus that includes an LED that performs continuous light emission. An AF auxiliary light output unit 116 improves the focus detection performance with respect to low-brightness subjects and low-contrast subjects by projecting an image of a mask that has a predetermined opening pattern on the field of view via a light projecting lens.

The CPU 121 controls the overall operation of the camera 100 and has an arithmetic portion, a ROM, a RAM, an A/D converter, a D/A converter, a communication interface circuit, and the like (not shown). The CPU 121 executes a program stored in a non-volatile recording medium (not shown) such as the ROM so as to control various circuits of the camera 100 and realize functions of the camera 100 such as AF, AE, image processing, and recording.

A flash control circuit 122 controls the lighting of the flash 115 in synchronization with an image capture operation. An auxiliary light drive control circuit 123 controls the lighting of the AF auxiliary light output unit 116 during a focus detection operation. An image sensor drive circuit 124 controls operation of the image sensor 107, as well as performs A/D conversion on image signals read out from the image sensor 107 and outputs the resulting image signals to the CPU 121. An image processing circuit 125 applies image processing such as y conversion, color interpolation, and JPEG encoding to an image signal.

The focusing drive circuit 126 performs focus adjustment by driving the focus actuator 114 under control of the CPU 121 so as to move the focusing lens 105 along the optical axis. The shutter drive circuit 128 controls the opening size and the opening and closing timing of the shutter 102 by driving the shutter actuator 112. The zooming drive circuit 129 drives the zoom actuator 111 according to a zoom operation input by a photographer by pressing a zoom operation switch included in an operation switch group 132, for example.

A display 131 is an LCD or the like, and displays information regarding the image capture mode of the camera 100, preview images before image capture, a confirmation image after image capture, information regarding the in-focus state during focus detection, and the like. The operation switch group 132 includes a power switch, a release (image capture trigger) switch, the zoom operation switch, an image capture mode selection switch, and the like. A recording medium 133 is a removable semiconductor memory card, for example, and records captured images.

Figure 2:
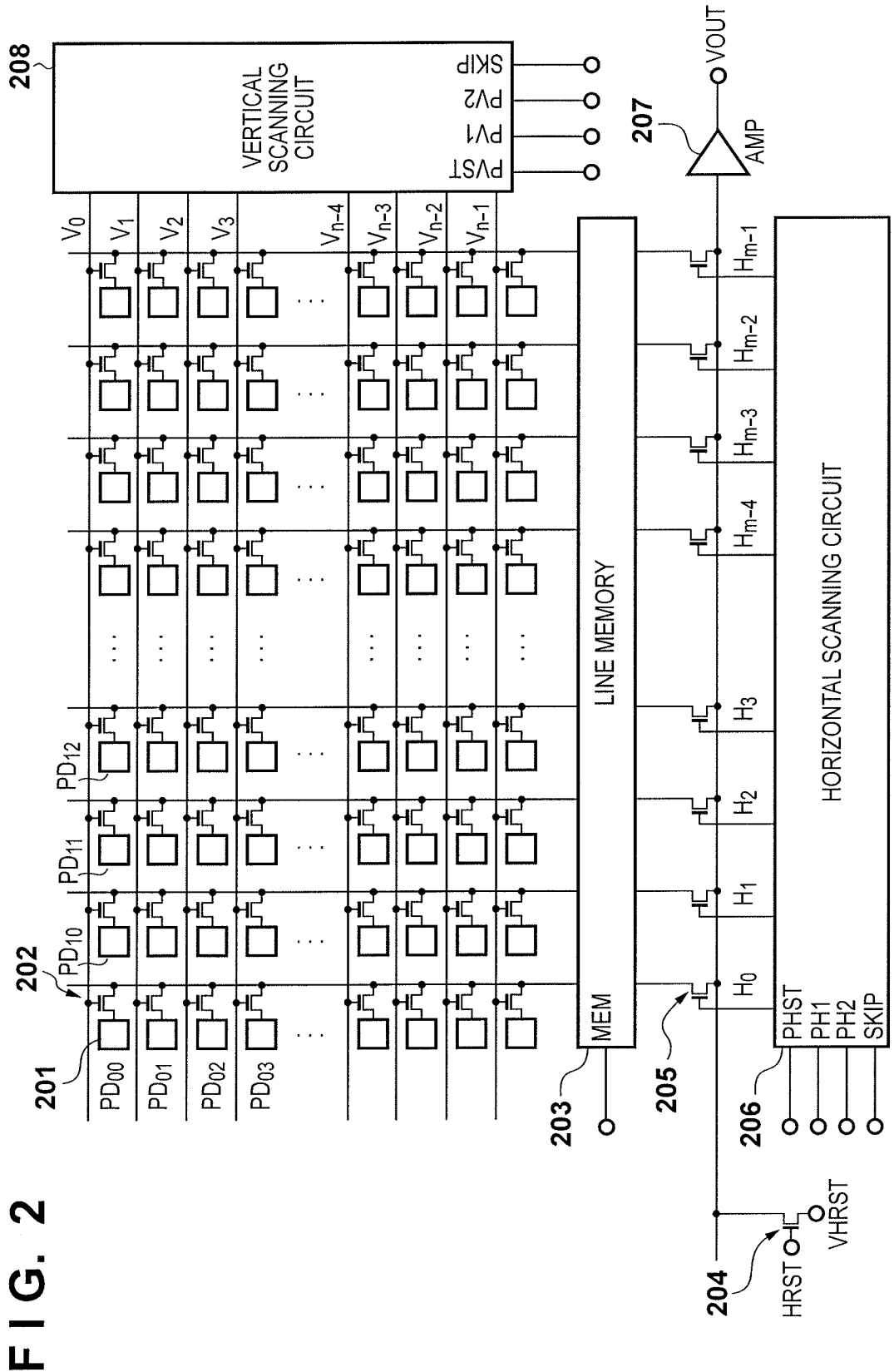
FIG. 2 is a block diagram showing an example of a configuration of an image sensor in FIG. 1.

FIG. 2 is a block diagram showing an example of the configuration of the image sensor 107. Note that FIG. 2 shows only the minimum required configuration for describing the readout operation, and does not show configurations related to pixel resetting and the like. A photoelectric conversion unit 201 is constituted by a photodiode, a pixel amplifier, a reset switch, and the like. Hereinafter, the photoelectric conversion unit 201 will be indicated by $PD_{mn}$. Here, m indicates the X-direction address, where m=0, 1, ..., m-1, and n indicates the Y-direction address, where n=0, 1, ..., n-1. Also, although m×n photoelectric conversion units 201 (m units in the horizontal (X) direction and n units in the vertical (Y) direction) are arranged two-dimensionally in the image sensor 107, reference numerals are only indicated in the vicinity of the upper left photoelectric conversion unit $PD_{00}$ in order to simplify the drawing.

A switch 202 is controlled by a vertical scanning circuit 208, and selects output from the photoelectric conversion units $PD_{mn}$ one row at a time.

A line memory 203 is normally constituted by a capacitor, and temporarily stores output from the one row worth of photoelectric conversion units selected by the vertical scanning circuit 208.

A switch 204 resets a horizontal output line to a predetermined potential VHRST under control of a signal HRST.

Switches 205 ($H_0$ to $H_{m-1}$) are connected to the line memory 203 and the horizontal output line. Due to a horizontal scanning circuit 206 successively switching on the switches 205, the output from the one row worth of photoelectric conversion units $PD_{mn}$ stored in the line memory 203 is read out to the horizontal output line.

A signal PHST input to the horizontal scanning circuit 206 is horizontal scanning circuit data input, and PH1 and PH2 are shift clock inputs. When PH1=H, data is set, and data is latched using PH2. Also, PHST is successively shifted by inputting a shift clock to the PH1 and PH2, thus making it possible to successively switch on the switches 205 ($H_0$ to $H_{m-1}$). A signal SKIP is control input for performing setting for thin-out readout. If the signal SKIP is set to the H level, the scanning of the switches 205 jumps a predetermined interval so as to perform thin-out readout in units of rows.

The vertical scanning circuit 208 can selectively switch on and off the switches 202 of the photoelectric conversion units $PD_{mn}$ by successively outputting control signals $V_0$ to $V_{n-1}$. The control signals $V_0$ to $V_{n-1}$ are controlled by a data input PVST, shift clocks PV1 and PV2, and a thin-out reading setting signal SKIP similarly to the horizontal scanning circuit 206. Details regarding operations here will not be given since they are similar to the operations of the horizontal scanning circuit 206.

Pixel Structure

FIGS. 3A to 5B are diagrams showing an example of the structure of pixels for imaging and pixels for focus-detection. The image sensor 107 of the present embodiment employs a Bayer array pixel arrangement in which a two-row×two-column array of four pixels serves as one unit, with pixels having G (green) spectral sensitivity arranged as two pixels at opposing corners, and pixels respectively having R (red) and B (blue) spectral sensitivity arranged as the other two pixels. Also, a portion of the pixels in this Bayer array are pixels for focus-detection. Accordingly, the image sensor 107 of the present embodiment can acquire image signals for use in focus detection that employs a phase-difference detection method. The pixels for focus-detection are arranged discretely.

Figure 3B:
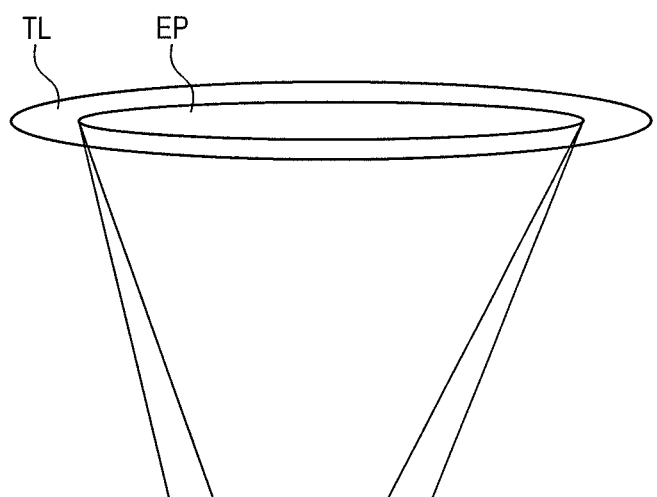
FIGS. 3A and 3B are diagrams showing an example of an arrangement and a structure of pixels for imaging of the image sensor according to the embodiment.
Figure 3A:
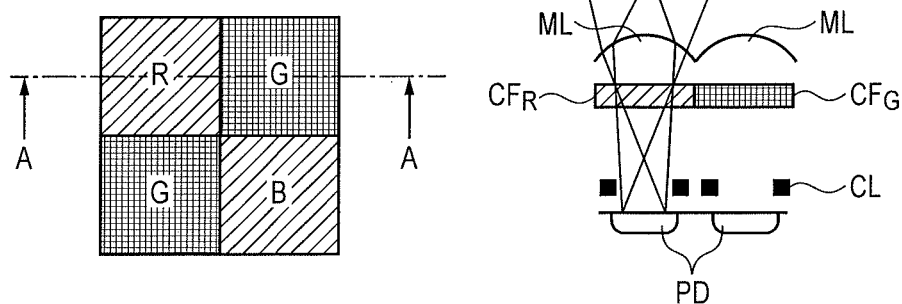

FIG. 3A is a plan view of pixels for imaging in two rows and two columns. As described above, in the Bayer array, two G pixels are arranged diagonally, and R and B pixels are arranged as the other two pixels. This two-row×two-column array is repeated over the entirety of the image sensor 107.

FIG. 3B is a diagram showing a cross-section taken along line A-A in FIG. 3A, and showing the optical path from the imaging optical system.

Here, ML indicates an on-chip microlens arranged at the top of each pixel, $CF_R$ indicates an R (red) color filter, and $CF_G$ indicates a G (green) color filter. PD schematically indicates a photoelectric conversion unit 501 of the pixel, and CL indicates a wiring layer for forming signal lines for transmitting various types of signals in the CMOS image sensor. TL schematically indicates the imaging optical system.

Here, the on-chip microlens ML and the photoelectric conversion unit PD of the pixels for imaging are configured so as to pick up light flux that passed through the imaging optical system TL as effectively as possible. In other words, an exit pupil EP of the imaging optical system TL and the photoelectric conversion unit PD are in a conjugate relationship due to the microlens ML, and the effective area of the photoelectric conversion unit PD is designed so as to be a large area. Also, although only light flux incident on the R pixel is shown in FIG. 3B, the G pixel and the B (blue) pixel also have the same structure. The exit pupil EP that corresponds to the RGB pixels for imaging therefore has a large diameter, thus efficiently picking up light flux from the subject and improving the S/N of the image signal.

FIGS. 4A and 4B show an example of the arrangement and structure of pixels for focus-detection that perform pupil division in the horizontal direction (lateral direction) of the imaging optical system, in the present embodiment. Here, the horizontal direction (lateral direction) refers to the lengthwise direction of the image sensor, for example.

FIG. 4A is a plan view of a two-row×two-column array of pixels that includes a pair of pixels for focus-detection. When performing recording or obtaining an image signal for display, the main component of the luminance information is acquired with the G pixels. Sensitivity to luminance information is high in human image recognition, and therefore image degradation is easily perceived if there is a loss in G pixels. On the other hand, the pixels other than the green pixel, that is to say the R pixel and the B pixel, are pixels for acquiring color information (color difference information), and since sensitivity to color information is low in human image recognition, image degradation is not likely to be noticed even if there is a certain extent of loss in pixels for obtaining color information. In view of this, in the present embodiment, the G pixels are left as pixels for imaging in the two-row×two-column array of pixels, and a pair of pixels for focus-detection $S_{HA}$ and $S_{HB}$ are arranged at the positions of the R pixel and the B pixel.

FIG. 4B is a diagram showing a cross-section taken along line A-A in FIG. 4A (i.e., a cross-section of the pair of pixels for focus-detection), and showing the optical path from the imaging optical system.

The microlens ML and the photoelectric conversion unit PD have the same structures as in the pixels for imaging shown in FIG. 3B. Since the signals from the pixels for focus-detection are not used as image signals in the present embodiment, a clear and colorless filter $CF_w$ (white) is arranged in place of the color-separation color filter. Also, in order to perform pupil division in the pixels, opening portions in the wiring layer CL are arranged so as to be eccentric in one direction relative to the center line of the microlens ML. Specifically, the openings of the pixel for focus-detection $S_{HA}$ and the pixel for focus-detection $S_{HB}$ that make up the pair of pixels for focus-detection are eccentric in mutually different directions.

More specifically, an opening portion $OP_{HA}$ of the pixel for focus-detection $S_{HA}$ is eccentric to the right side, thus receiving light flux that passed through an exit pupil $EP_{HA}$ on the left side of the imaging optical system TL. Similarly, an opening portion $OP_{HB}$ of the pixel for focus-detection $S_{HB}$ is eccentric to the left side, thus receiving light flux that passed through an exit pupil $EP_{HB}$ on the right side of the imaging optical system TL. The luminance signal acquired by multiple pixels for focus-detection $S_{HA}$ arranged regularly in the horizontal direction will be referred to as the A image signal (first image signal). Also, the luminance signal acquired by multiple pixels for focus-detection $S_{HB}$ arranged regularly in the horizontal direction will be referred to as the B image signal (second image signal). By detecting the relative positions of the A image signal and the B image signal and multiplying the image misalignment amount by a conversion factor, it is possible to calculate the focus misalignment amount (defocus amount) of a subject image that has a luminance distribution in the horizontal direction.

Figure 5A:
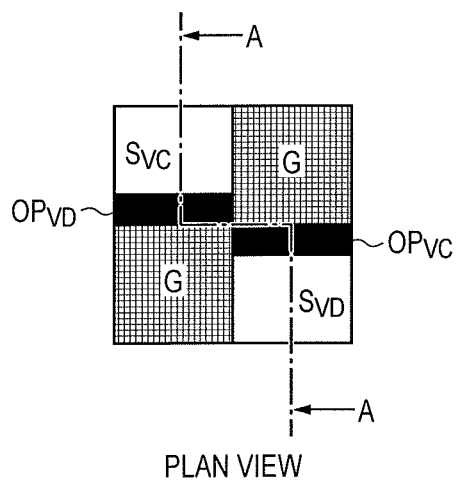
FIGS. 5A and 5B are diagrams showing an example of an arrangement and a structure of pixels for focus-detection of the image sensor that perform pupil division in the vertical direction (longitudinal direction) of the lens, according to the embodiment.
Figure 5B:
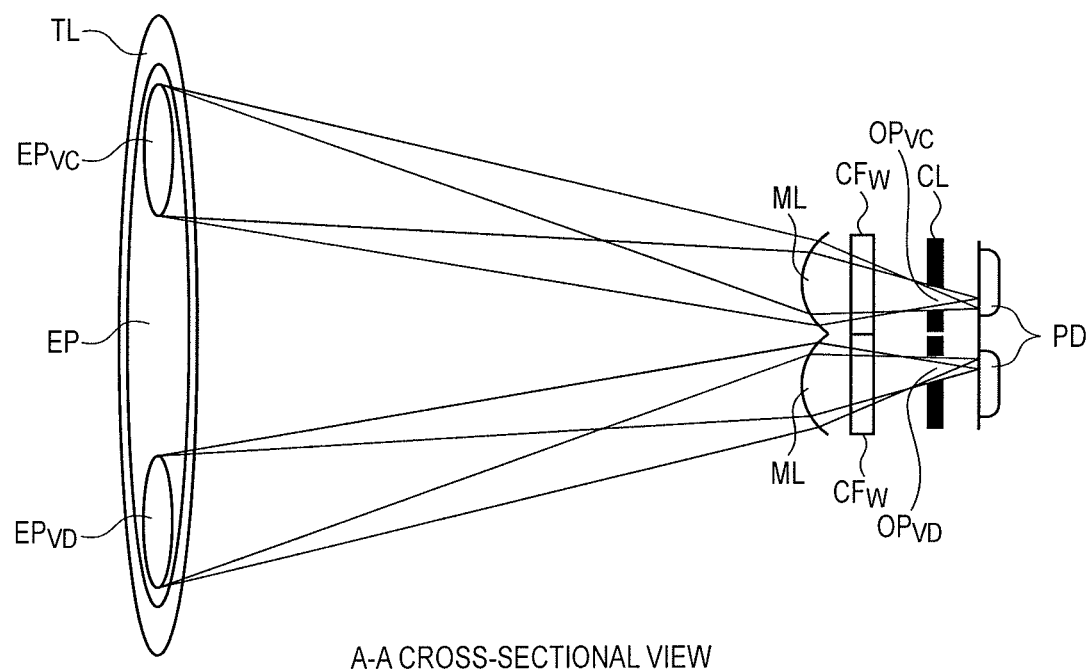

FIGS. 5A and 5B show an example of the arrangement and structure of pixels for focus-detection that perform pupil division in the vertical direction (longitudinal direction) of the imaging optical system, in the present embodiment. The vertical direction (longitudinal direction) is the direction that is orthogonal to the lengthwise direction of the image sensor, for example.

FIG. 5A is a plan view of a two-row×two-column array of pixels that includes pixels for focus-detection, and similarly to FIG. 4A, the G pixels are left as pixels for imaging, and a pair of pixels for focus-detection $S_{VC}$ and $S_{VD}$ are arranged at the positions of the R and B pixels.

FIG. 5B is a diagram showing a cross-section taken along line A-A in FIG. 5A (i.e., a cross-section of the pair of pixels for focus-detection), and showing the optical path from the imaging optical system.

As can be seen in a comparison with FIG. 4B, the pixels for focus-detection in FIG. 5B have the same structure with the exception that the pupil separation direction is the longitudinal direction. In other words, an opening portion $OP_{VC}$ of the pixel for focus-detection $S_{VC}$ is biased downward in the vertical direction, thus receiving light flux that passed through an exit pupil $EP_{VC}$ on the upper side of the lens TL. Similarly, an opening portion $OP_{VD}$ of the pixel for focus-detection $S_{VD}$ is biased upward in the vertical direction, thus receiving light flux that passed through an exit pupil $EP_{VD}$ on the lower side of the lens TL.

The subject image acquired by multiple pixels for focus-detection $S_{VC}$ arranged regularly in the vertical direction will be referred to as the C image signal. Also, the subject image acquired by multiple pixels for focus-detection $S_{VD}$ arranged regularly in the vertical direction will be referred to as the D image signal. By detecting the relative positions of the C image signal and the D image signal and multiplying the image misalignment amount by a conversion factor, it is possible to detect the focus misalignment amount (defocus amount) of a subject image that has a luminance distribution in the vertical direction.

Next, a method of obtaining the conversion factor for calculating the defocus amount from the image misalignment amount will be described. The conversion factor can be calculated based on aperture information of the imaging optical system and the sensitivity distribution of the pixels for focus-detection. FIGS. 6A to 7B schematically show how light flux that has been limited by several constituent members, such as the diaphragm 102 and the lens holding frame of the imaging optical system TL, is incident on the image sensor 107.

Figure 6A:
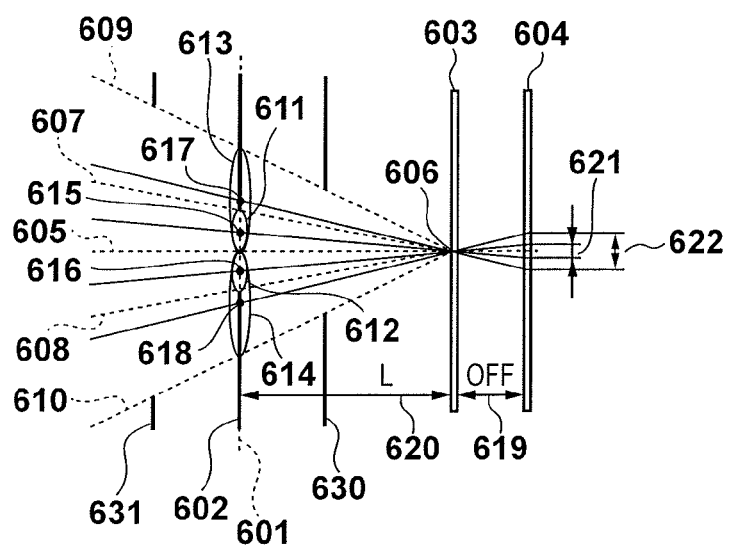
FIGS. 6A and 6B are diagrams schematically showing how light flux that is incident on pixels in the central region of the image sensor is limited by the diaphragm of the imaging optical system at the position of the exit pupil plane.
Figure 6B:
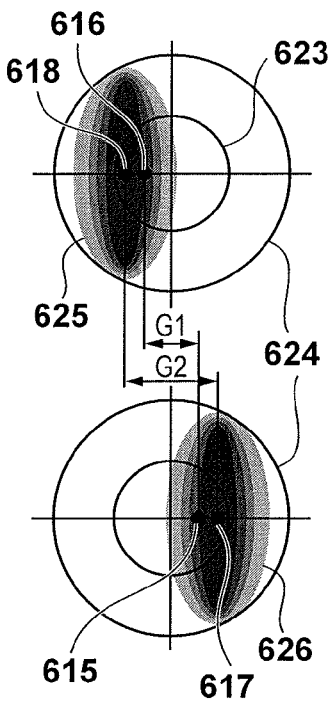

FIGS. 6A and 6B schematically show how light flux that is incident on pixels in the central region of the image sensor has been limited by a diaphragm 602 of the imaging optical system at the position of an exit pupil plane 601. In FIG. 6A, 603 and 604 indicate positions of the image sensor, where 603 indicates the planned imaging plane position. Also, 605 indicates the optical axis, 606 indicates the position of the optical axis on the image sensor, 607 and 608 indicate ranges of incident light flux in the case where the light flux is limited by the diaphragm 602, and 609 and 610 indicate ranges of incident light flux in the case where the light flux is not limited by the diaphragm 602. The light flux for focus-detection that correspond to the ranges 607 and 608 are indicated by 611 and 612, and the centroid positions of the light flux for focus-detection are indicated by 615 and 616. Similarly, the light flux for focus-detection that correspond to the ranges 609 and 610 are indicated by 613 and 614, and the centroid positions of the light flux for focus-detection are indicated by 617 and 618. Also, 630 indicates the position of the lens holding frame when it is located closest to the image sensor, and 631 indicates the position of the lens holding frame when it is located closest to the subject.

FIG. 6B is a diagram showing change in the centroid positions of the limited light flux that is incident from the exit pupil plane 601 on the pixels for focus-detection in the center of the image sensor. Here, 624 indicates pupil regions that correspond to the ranges 609 and 610 of light flux that is incident on the pixels in the center of the image sensor in the case of not being limited by the diaphragm 602. Also, 623 indicates pupil regions that correspond to the ranges 607 and 608 of light flux that is incident on the pixels in the center of the image sensor in the case of being limited by the diaphragm 602. In FIG. 6A, 621 indicates the range that corresponds to the pupil region 623, and 622 indicates the range that corresponds to the pupil region 624, in the case where the image sensor is at the position 604.

Also, 625 and 626 indicate the incidence angle characteristics (sensitivity distributions) of the pixels for focus-detection $S_{HA}$ and $S_{HB}$. Light flux that passed through the pupil regions 623 and 624 is incident on the pixels for focus-detection $S_{HA}$ and $S_{HB}$ with the sensitivity distributions 625 and 626. FIG. 6B shows the centroid positions 615 and 616 of the light flux for focus-detection that was incident after passing through the pupil region 623, as well as the centroid positions 617 and 618 of the light flux for focus-detection that was incident after passing through the pupil region 624. By obtaining these centroid positions, it is possible to obtain the centroid gap in the case where light flux used for focus-detection is limited and the case where it is not limited. Storing this information on the sensitivity distributions of the pixels for focus-detection and the aperture information of the imaging optical system in advance makes it possible to obtain the conversion factor for calculating a defocus amount from the image misalignment amount.

In FIG. 6A, DEF indicates a defocus amount 619, and L indicates a distance 620 from the image sensor position 603 to the exit pupil plane 601. Also, the centroid gaps in the cases where light flux used for focus-detection is limited and is not limited are respectively indicated by G1 (distance between 615 and 616) and G2 (distance between 617 and 618). Furthermore, letting PRED1 621 be the image misalignment amount in the case of the pupil region 623, PRED2 622 be the image misalignment amount in the case of the pupil region 624, and K1 and K2 be the conversion factors for converting the image misalignment amount into a defocus amount, the defocus amount is obtained using the following equation.

$$DEF = K1 \times PRED1 = K2 \times PRED2$$

The conversion factors K1 and K2 for converting the image misalignment amount into a defocus amount are respectively obtained using the following equations.

$$K1 = G1/L$$

$$K2 = G2/L$$

If the focus detection position (AF frame) is not in the vicinity of the optical axis, vignetting (limiting) of the light flux for focus-detection occurs due to the exit pupil of the diaphragm at a position other than the exit pupil plane 601, and due to an exit pupil that corresponds to the lens holding frame of the imaging optical system other than the diaphragm even if the F-number is brighter than that of the exit pupil of the diaphragm.

Figure 7A:
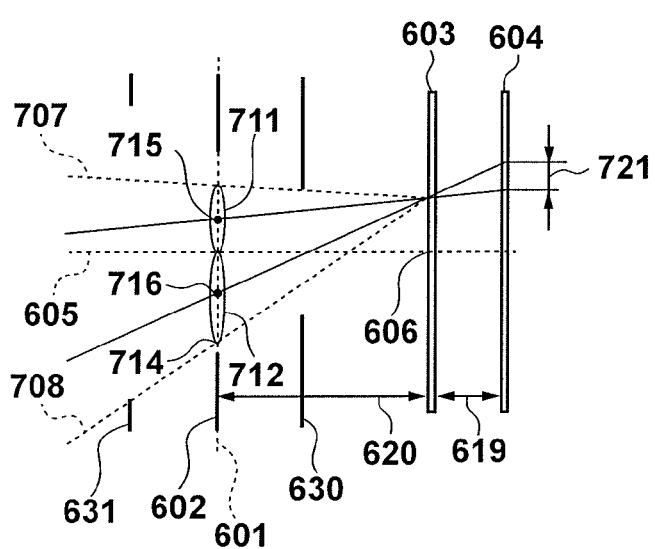
FIGS. 7A and 7B are diagrams schematically showing how light flux that is incident on pixels at the image height of the image sensor is limited by the diaphragm of the imaging optical system at the position of the exit pupil plane.
Figure 7B:
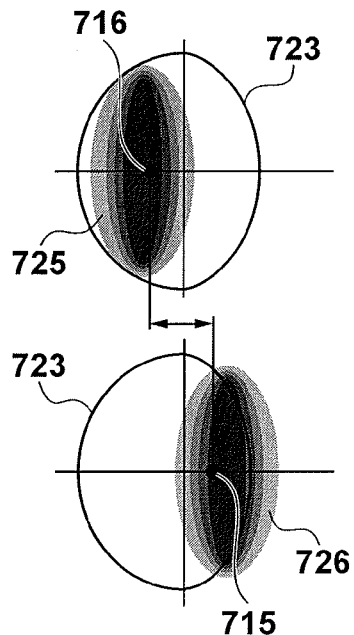

FIGS. 7A and 7B show how light flux that is incident on pixels for imaging at a position away from the center of the image sensor (the position corresponding to the optical axis) is limited by the lens holding frame. In FIG. 7A, elements that are the same as in FIG. 6A are indicated by the same reference signs. Here, 707 and 708 indicate the ranges of light flux that is incident in the cases where the light flux is limited by the lens holding frame when it is located at a position 730 closest to the image sensor and when it is located at a position 731 closest to the subject. The light flux for focus-detection that correspond to the ranges 707 and 708 are indicated by 711 and 712, and the centroid positions of the light flux for focus-detection are indicated by 715 and 716.

FIG. 7B is a diagram showing the centroid positions of the limited light flux that is incident from the exit pupil plane 601 on pixels for focus-detection at a position whose distance from the center of the image sensor is the image height. Here, 723 indicates the pupil region that corresponds to the ranges 707 and 708 of limited light flux that was incident on the pixels at a position whose distance from the center of the image sensor is the image height. Also, 725 and 726 indicate the incidence angle characteristics (sensitivity distributions) of the pixels for focus-detection $S_{HA}$ and $S_{HB}$. Light flux that passed through the pupil region 723 is incident on the pixels for focus-detection $S_{HA}$ and $S_{HB}$ with sensitivity distributions 725 and 726. For this reason, by obtaining centroids 715 and 716 of the distributions of the light flux for focus-detection that passed through the pupil region 723, it is possible to obtain the centroid gap in the case where light flux used for focus-detection is limited by the lens holding frame. Storing this information on the sensitivity distributions of the pixels for focus-detection and the aperture information of the imaging optical system in advance makes it possible to obtain the conversion factor for calculating a defocus amount from the image misalignment amount.

In FIG. 7A, DEF indicates the defocus amount 619, and L indicates the distance 620 from the image sensor position 603 to the exit pupil plane 601. Also, the centroid gap in the case where light flux for focus-detection has been limited by the lens holding frame at the positions 630 and 631 is indicated by G3 (distance between 715 and 716), and let PRED3 721 be the image misalignment amount and let K3 be the conversion factor for converting the image misalignment amount into a defocus amount. In this case, the defocus amount is obtained using the following equation.

$$DEF = K3 \times PRED3$$

The conversion factor K3 for converting the image misalignment amount into a defocus amount is obtained using the following equation.

$$K3 = G3/L$$

Here, it is shown how the light flux for focus-detection is limited by the lens holding frame depending on the position of the focus detection region on the image sensor. However, the position on the image sensor where light flux is limited also changes depending on a magnification operation that accompanies forward and rearward movement of the lens groups 101, 102, and 103, and also change in the position of the focusing lens 105. The factor for converting the image misalignment amount into a defocus amount changes along with a change in the position on the image sensor where light flux is limited.

Figure 8:
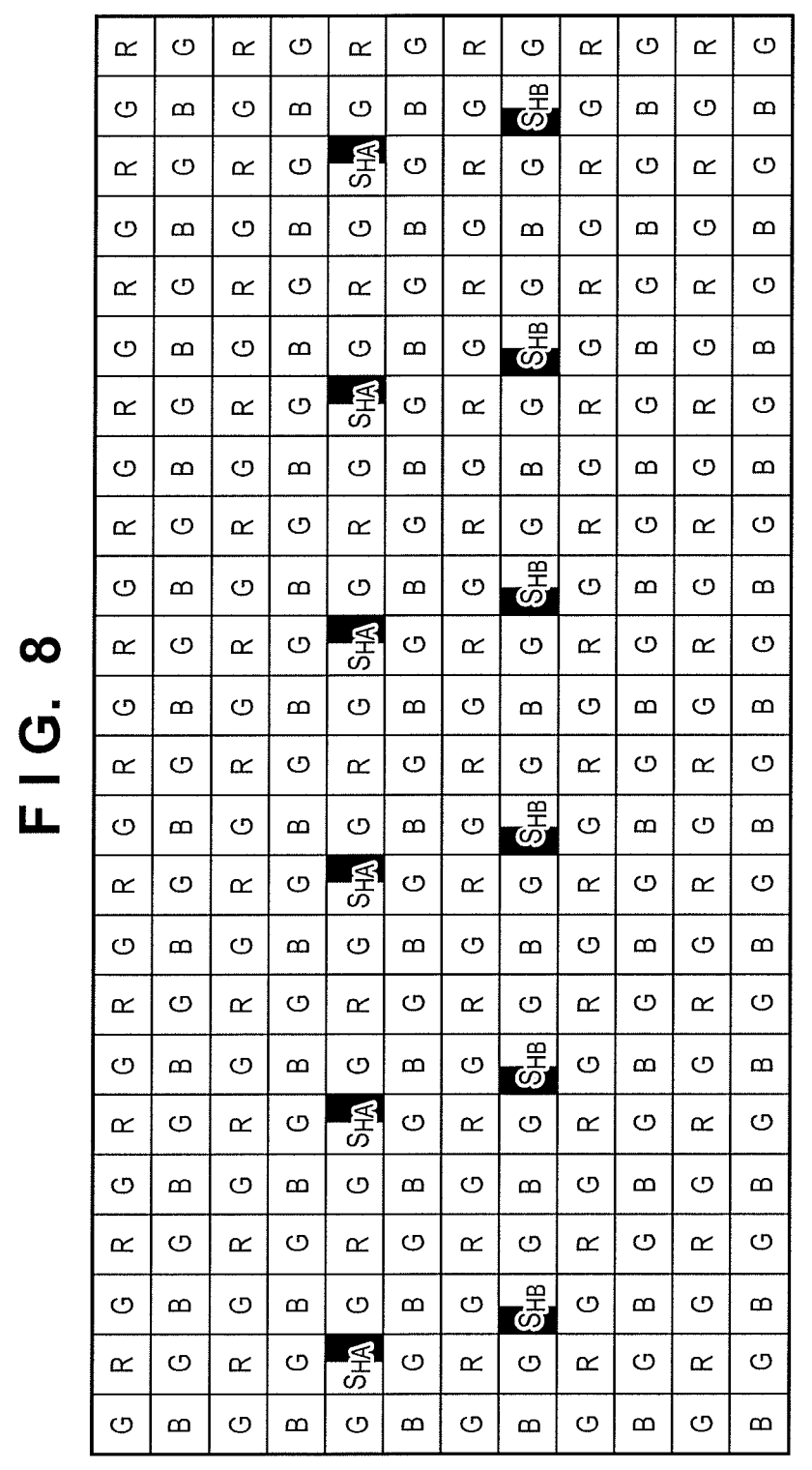

FIG. 8 is a diagram showing an example of the arrangement of pixels for imaging and pixels for focus-detection, and a portion of the pixels of the image sensor 107 is shown. In this figure, G indicates a pixel that has a green filter, R indicates a pixel that has a red filter, and B indicates a pixel that has a blue filter. Also, $S_{HA}$ and $S_{HB}$ in this figure indicate pixels for focus-detection that are for detecting an image misalignment amount in the horizontal direction, which have been described with reference to FIGS. 4A and 4B. The white portions in the pixels $S_{HA}$ and $S_{HB}$ indicate the biased opening positions of the pixels. Note that although FIG. 8 shows an example in which only pixels for focus-detection that are for detecting the image misalignment amount in the horizontal direction are arranged, the pixels for focus-detection that are for detecting the image misalignment amount in the vertical direction, which have been described with reference to FIGS. 5A and 5B, may be arranged additionally or alternatively.

Figure 9:
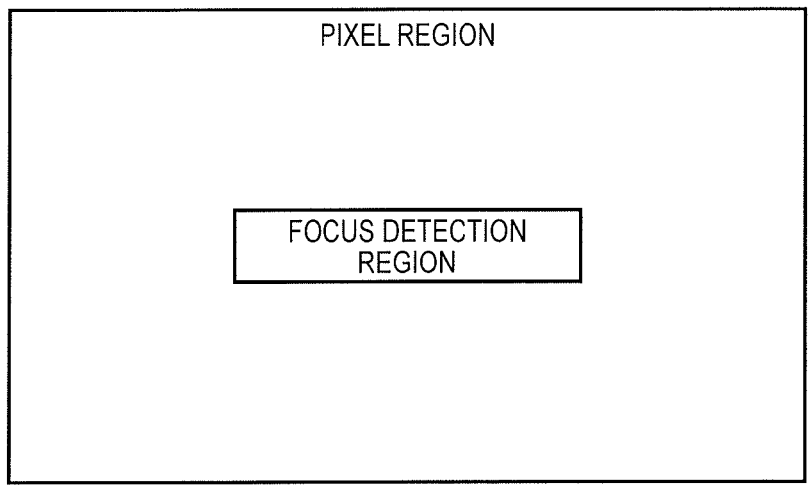
FIG. 9 is a diagram showing an example of the position of a set focus detection region in the embodiment.

FIG. 9 shows an example of the position of the focus detection region in the pixel region of the image sensor. The pixel arrangement in the focus detection region is as shown in FIG. 8. Although one focus detection region is set in the center of the pixel region in the present embodiment, a configuration is possible in which multiple focus detection regions are arranged, and image signals are generated by the pixels for focus-detection from subject images formed in the respective regions. Note that the focus detection region may be set as a region in the image capture screen.

The following describes the focus detection operation in the camera 100.

Figure 10:
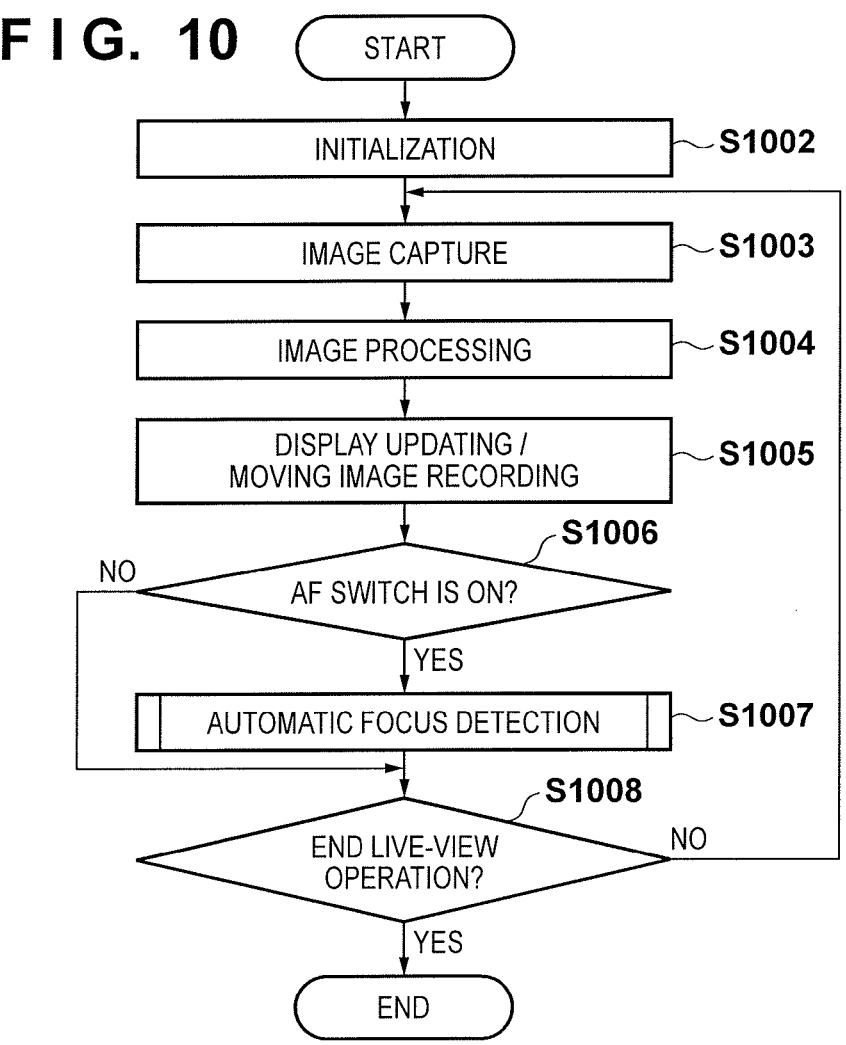
FIG. 10 is a flowchart for describing an automatic focus detection operation performed during a live-view operation in a camera according to the embodiment.
Figure 11:
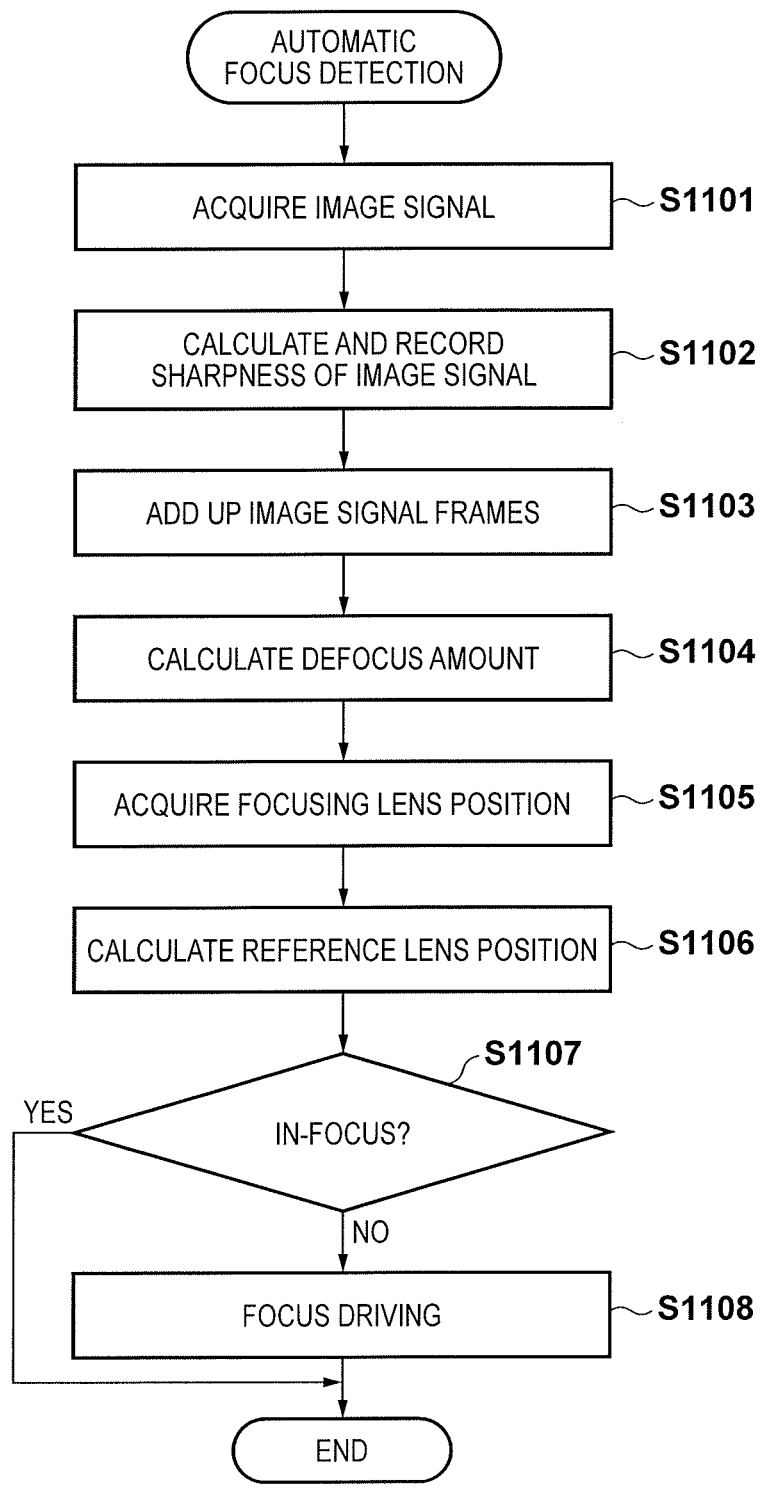
FIG. 11 is a flowchart for describing an automatic focus detection operation performed during a live-view operation in a camera according to the embodiment.

FIGS. 10 and 11 are flowcharts for describing the automatic focus detection operation during the live-view operation of the camera 100.

The live-view operation is started when, for example, the user switches on the power switch of the operation switch group 132 or switches the camera 100 from the playback mode to the imaging mode by operating a mode switching switch.

In step S1002, the CPU 121 performs an operation check on the actuators 111, 112, and 114 and the image sensor 107 in the camera 100, and performs an initialization operation for initializing a memory and an execution program, and the like. The CPU 121 also executes an image capture preparation operation.

From steps S1003 to S1005, so-called live-view driving is performed, which includes starting moving image capturing at a predetermined frame rate with the image sensor 107, reading out an image signal, generating image data, and displaying the moving image on the display 131, recording it to the recording medium 133, or the like.

This live-view driving will be described below.

Figure 12:
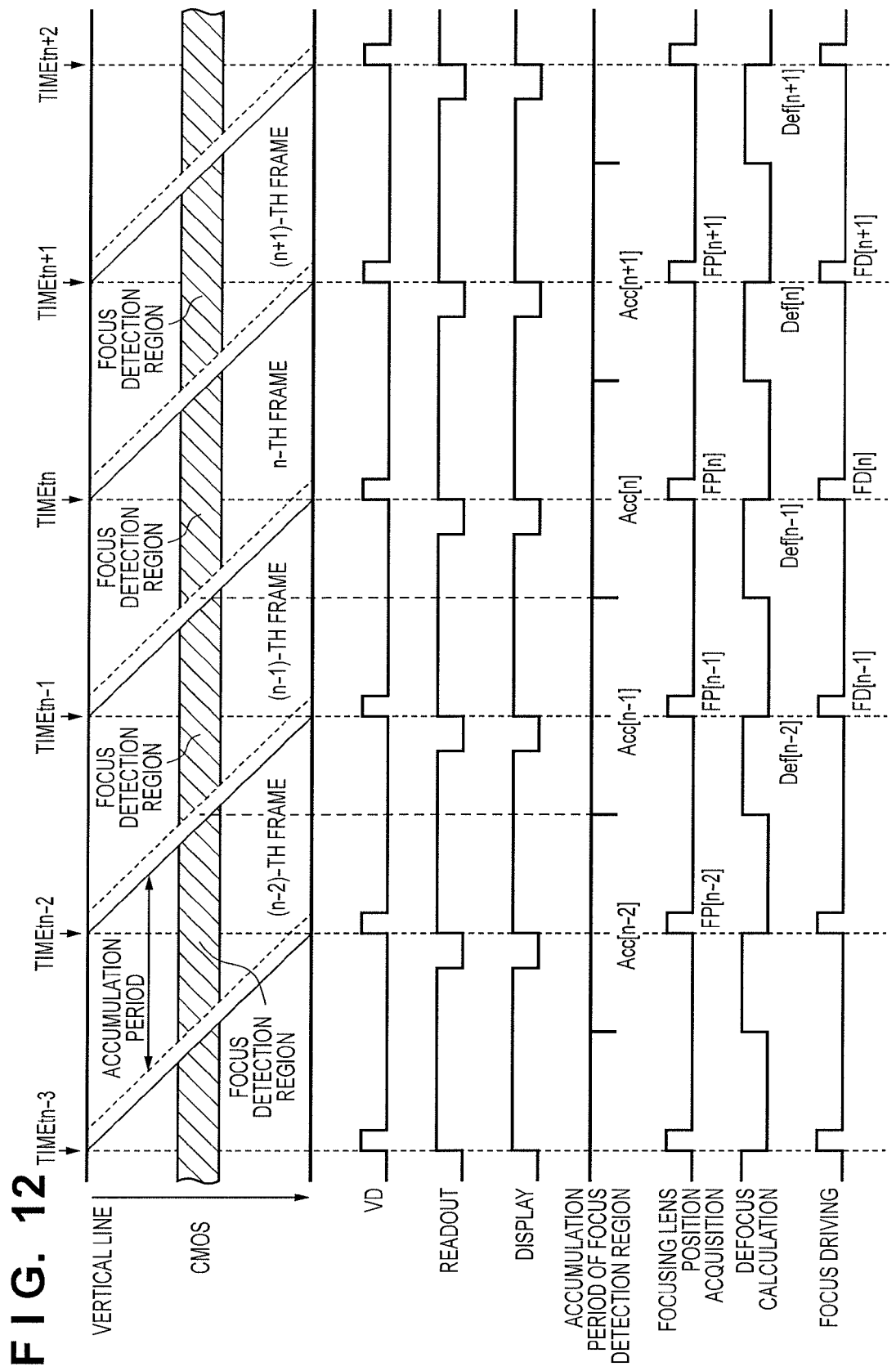
FIG. 12 is a timing chart showing an outline of an image capture operation sequence during live-view display or moving image recording in the image sensor according to the embodiment.

FIG. 12 is a timing chart for describing an overview of the sequence of the image capture operation during live-view display or moving image recording in the case where the image sensor 107 is a CMOS image sensor. In order to realize the live-view function, the image signal needs to be continuously read out from the image sensor. CMOS image sensors generally employ a rolling shutter readout system, and the operation for reading out the accumulated charges of the pixels of the image sensor 107 is performed in synchronization with a control pulse vertical synchronization signal VD and a horizontal synchronization signal HD (not shown). The vertical synchronization signal VD indicates one frame period of image capturing, and is output from the image sensor drive circuit 124 to the image sensor 107 upon receiving a command from the CPU 121 every 1/30 sec (in the case of a frame rate of 30 frames/sec; moving image shooting at 30 frames/sec is assumed in the following description), for example.

Also, the image sensor drive circuit 124 furthermore outputs the same number of horizontal synchronization signals HD as the number of horizontal lines in one frame period at a predetermined interval, thus performing horizontal line control. Pixel resetting for each horizontal line so as to achieve a set accumulation period is performed in synchronization with the horizontal synchronization signals HD (shown by dashed lines in the figure). This results in deviation between the accumulation period and the readout timing in each line in the image signal corresponding to one frame.

The image signal that was read out in accordance with the accumulation and readout control performed according to the vertical synchronization signal VD and the horizontal synchronization signals HD is transferred to the image processing circuit 125 and subjected to image processing such as gamma conversion, color interpolation, defective pixel correction, and image compression processing (step S1004). The image resulting from image processing is then used for display on the display 131, recording to the recording medium 133, or the like (step S1005).

Also, the image signal that was read out is used for detecting the brightness of the subject image as well. The CPU 121 performs so-called automatic exposure control (AE) for adjusting the diaphragm, the accumulation period, the ISO sensitivity, and the like based on the brightness of the subject image and a programming line map.

Returning to FIG. 10, in step S1006 the CPU 121 determines whether or not a focus detection switch (AF switch) of the operation switch group 132 has been switched on, moves to step S1008 if it has not been switched on, and moves to the processing of a subroutine related to the automatic focus detection operation in step S1007 if it has been switched on.

The following describes the automatic focus detection operation in step S1007 with reference to the flowchart of FIG. 11. In step S1101, the CPU 121 acquires signals from the pixels for focus-detection in the focus detection region in the current frame, generates the A image signal and the B image signal, and stores them in an internal memory.

In step S1102, the CPU 121 calculates the sharpness of the pair of image signals stored in the internal memory and stores the sharpness as sharpness information corresponding to the image signals. For example, letting $S_{HA[n]}$ and $S_{HB[n]}$ (n=0, 1, 2 ... nMAX) be the respective pieces of signal data from the pixels for focus-detection that make up the pair of image signals, the sharpness (indicated by "Sharpness") can be calculated using the following equations.

$$\text{Sharpness\_sa} = \sum_{n=0}^{nMAX-1} (S_{HA[n]} - S_{HA[n+1]})^2 / \sum_{n=0}^{nMAX-1} S_{HA[n]} - S_{HA[n+1]} \quad (1)$$

$$\text{Sharpness\_sb} = \sum_{n=0}^{nMAX-1} (S_{HB[n]} - S_{HB[n+1]})^2 / \sum_{n=0}^{nMAX-1} S_{HB[n]} - S_{HB[n+1]} \quad (2)$$

$$\text{Sharpness} = (\text{Sharpness\_sa} + \text{Sharpness\_sb})/2 \quad (3)$$

Note that the sharpness may be calculated using another method.

Figure 13:
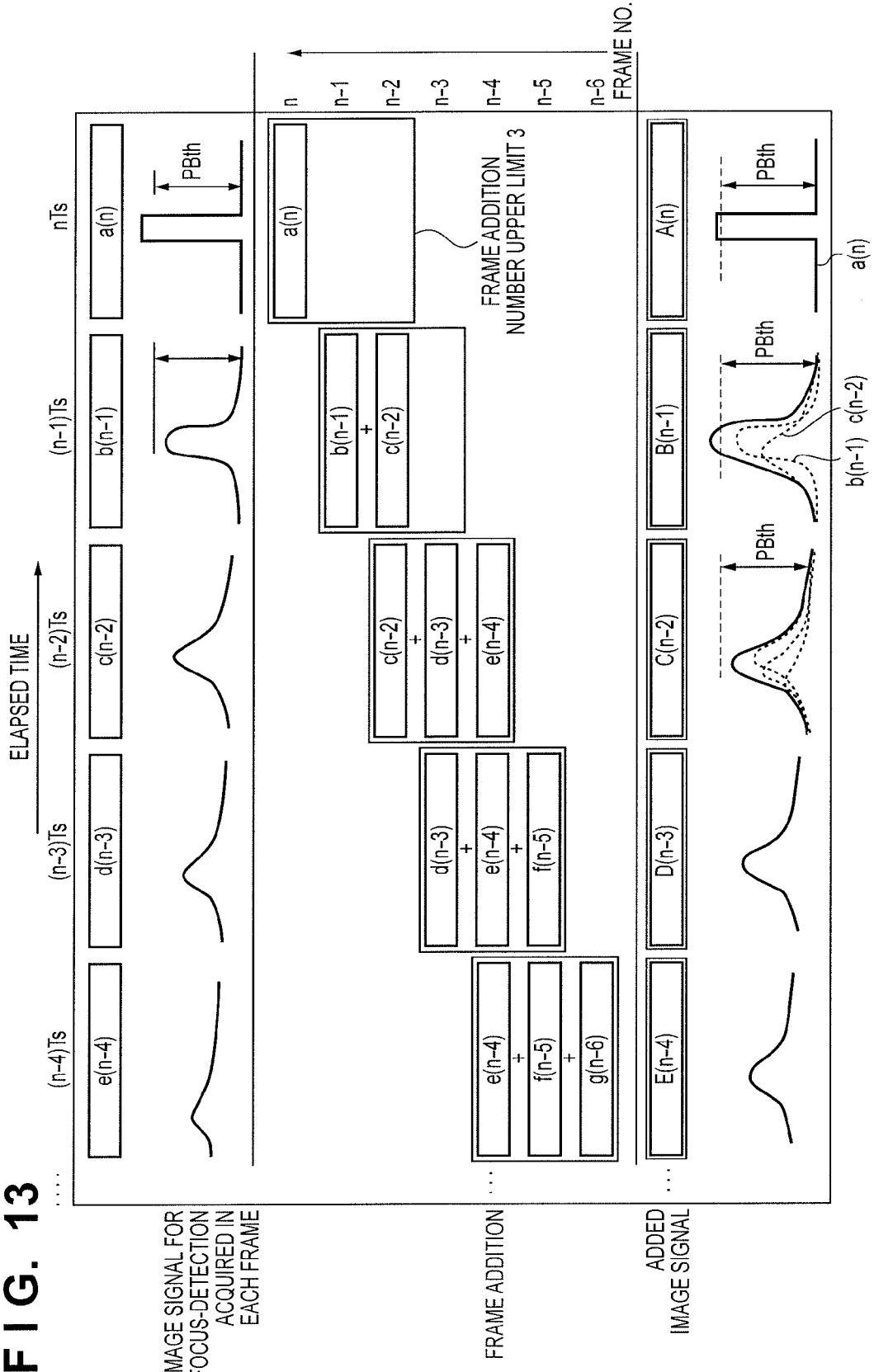
FIG. 13 is a diagram showing a method of adding up pixels for focus-detection of the image sensor according to the embodiment.

In step S1103, the CPU 121 reads out multiple frames worth of signal data from the pixels for focus-detection from the internal memory, and performs addition processing. The following describes this addition processing with reference to FIG. 13. In the present embodiment, the focus detection operation can be performed in parallel with the movement of the focusing lens 105 to the in-focus position, and FIG. 13 shows how the focusing lens 105 moves closer to the in-focus position each time a certain amount of time has elapsed. The elapsed time of image signal readout is shown at the top in this figure. Also, Ts indicates a predetermined cycle of image signal readout, n indicates the readout cycle of the current frame, and nTs indicates the time of the current frame.

The display is refreshed with new image data read out in each frame. Data corresponding to the A image signal and the B image signal, which were generated from signals from the pixels for focus-detection, is stored in the internal memory for each frame. For example, a pair of image signals for focus-detection that were generated from the n-th frame is stored as image signals for focus-detection a(n). In the present embodiment, the number of frames that are to be subjected to addition processing (frame addition number) is determined based on the image signal that has the smaller difference between the highest value and the lowest value (peak-to-bottom value, which will be referred to hereinafter as the PB value). FIG. 13 therefore shows the type of image signal that has the lower PB value between the pair of image signals. The image signal having the larger PB value is also subjected to frame addition using the same frame addition number determined based on the image signal having the smaller PB value.

In the present embodiment, the frame addition number is determined as described below. First, the CPU 121 compares the smaller one of the PB values of the image signals for focus-detection that were generated in the current frame with a threshold value PBth, and determines the frame addition number to be "1" if the PB value is greater than the threshold value PBth. In other words, the image signal that was obtained in the current frame is used, as is, as an added image signal without being subjected to addition processing. In the example in FIG. 13, the PB value of the image signal a(n) (the one that has the smaller PB value) that was obtained in the current frame n is greater than the threshold value PBth, and therefore that image signal a(n) is used, as is, as an added image signal A(n). Accordingly, the image signal having the larger PB value is also used, as is, as an added image signal.

Also, if the PB value of the image signal that was generated in the current frame is less than or equal to the threshold value PBth, the CPU 121 adds the image signal that was generated in the immediately previous frame, and determines whether the PB value of the image signal resulting from the addition is greater than the threshold value PBth. If the PB value is still less than or equal to the threshold value PBth, the CPU 121 successively adds the image signals that were generated in successively older frames until the PB value of the image signal resulting from the addition exceeds the threshold value PBth.

In FIG. 13, the PB value of an image signal b(n−1) that was obtained in the (n−1)-th frame is less than or equal to the threshold value PBth, and therefore an image signal c(n−2) of the same type that was obtained in the immediately previous (n−2)-th frame is added. The PB value of the resulting added image signal B(n−1) is greater than the threshold value PBth, and therefore the CPU 121 determines that the frame addition number is "2" for the (n−1)-th frame.

Also, the frame addition number is provided with an upper limit in the present embodiment, and if the PB value of the added image signal is not greater than the threshold value PBth even when the frame addition number has reached the upper limit, the signal resulting from addition using the upper limit is used as the added image signal. In FIG. 13, the upper limit of the frame addition number is set to "3", and since the PB value in the (n−2)-th frame is less than or equal to the threshold value PBth, an added image signal C(n−2) corresponding to the upper limit "3" is used. In the case of the (n−3)-th and (n−4)-th frames as well, added image signals D(n−3) and E(n−4) that correspond to the upper limit "3" are respectively used.

Returning to FIG. 11, in step S1104 the CPU 121 calculates a defocus amount based on the pair of added image signals obtained in step S1103. Specifically, the CPU 121 obtains an image misalignment amount by applying correlation calculation processing to the pair of added image signals, and also performs processing for determining the reliability of the correlation. If it is determined that the reliability is sufficient for calculation of a defocus amount, the CPU 121 calculates a defocus amount by multiplying the image misalignment amount by the conversion factor that was obtained using the previously-described method.

In step S1105, the CPU 121 corrects the drive target position of the focusing lens 105 in parallel with movement of the focusing lens 105 to the in-focus position, acquires information on the focal position of the lens at the current time in order to perform focus driving, and stores this information in the internal memory.

The operations in step S1105 will be described in more detail below with reference to FIGS. 12 and 14. Note that the case of not performing frame addition will be described in order to simplify the description and facilitate understanding.

The focus detection region is set in the center of the pixel region in the present embodiment, and therefore when focus is placed on a time to in FIG. 12, a defocus amount Def[n−1] is obtained based on the signals obtained in an accumulation period Acc[n−1] in the focus detection region in the (n−1)-th frame. The accumulation period corresponds to the period from the accumulation start time for the first pixel line in the region in which the focus detection region is set to the accumulation end time for the last pixel line. In this way, there is a deviation between the accumulation (exposure) period and the time tn at which the defocus amount is obtained, and the focusing lens 105 moves during that time. Accordingly, the defocus amount Def[n−1] obtained at the time tn includes a deviation that corresponds to the difference between focusing lens positions FP[n] and FP[n−1].

Figure 14:
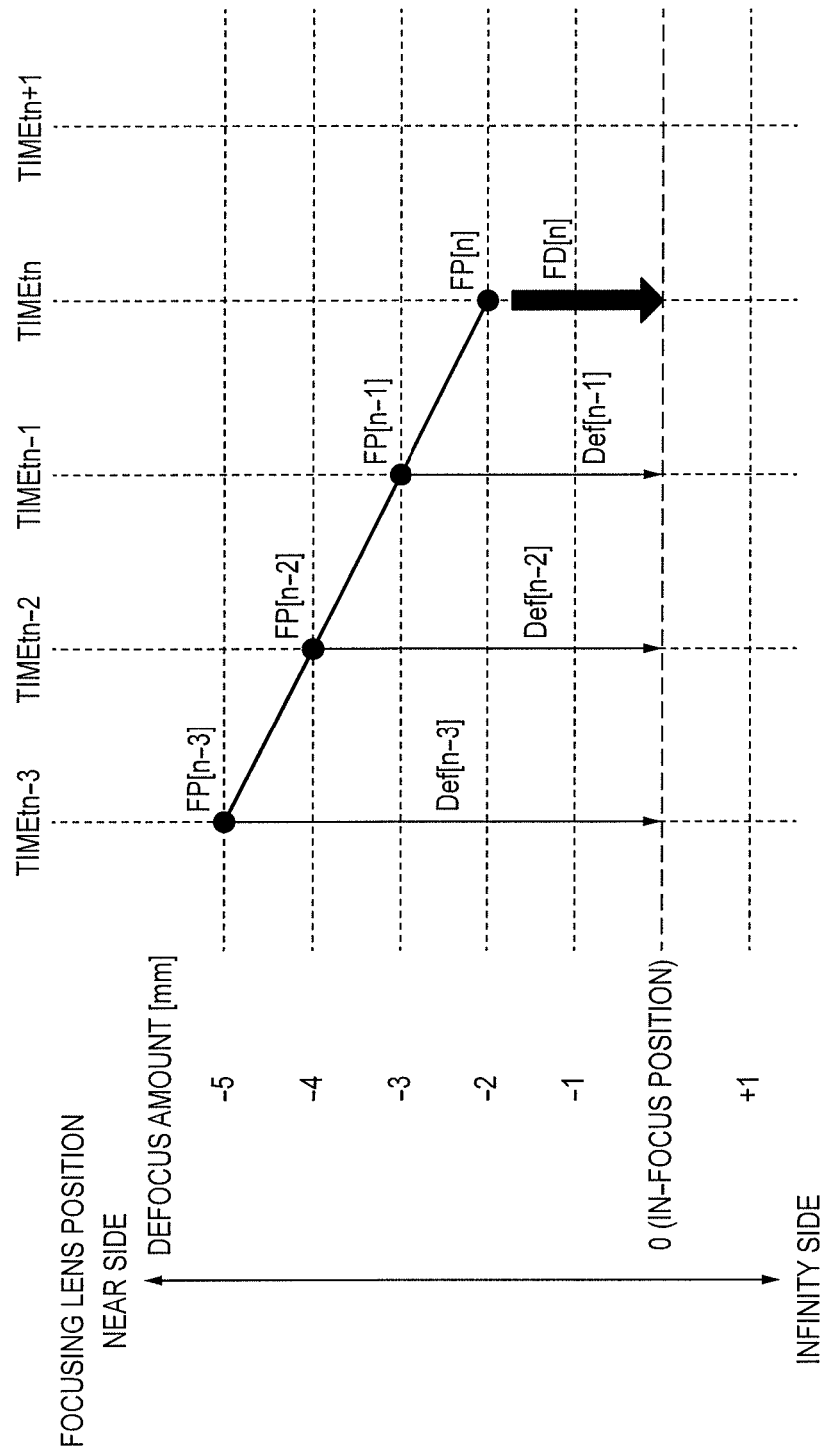
FIG. 14 is a diagram for describing a method of performing focus control during lens driving according to the embodiment.

FIG. 14 shows the relationship between focus driving FD[n] that starts at the time tn, a focusing lens position FP[n] obtained at the time tn, and a focusing lens position FP[n−1] and a defocus amount Def[n−1] at a time tn−1. It can be understood from FIG. 14 that in the focus driving FD[n] carried out at the time tn, the defocus amount Def[n−1] needs to be corrected by an amount that corresponds to the difference between focal positions (FP[n]-FP[n−1]). In other words, if the focusing lens position at the accumulation timing of the image signal that was used to calculate the defocus amount during focus lens driving (referred to hereinafter as the "reference lens position") is not known, error will arise in the focus driving amount.

Next, a method of calculating the reference lens position (step S1106) in the case of calculating the defocus amount using added image signals as in the present embodiment will be described with reference to FIGS. 15 and 16.

FIG. 15 shows an example of a time series of the reference lens position, image signal waveforms, the image misalignment amount and the sharpness of the image signals, added image signal waveforms, and the image misalignment amount of the added image signals while the focusing lens moves toward the in-focus position. Here, the frame addition numbers are all "3", and the added image signals are obtained as three frames worth of image signals including the current frame and the two previous frames.

Also, FIG. 16 shows the relationship between the image misalignment amount and the reference lens position. In this figure, 16a shows the relationship between the image misalignment amount and the reference lens position in each frame in FIG. 15. Since frame addition is not performed, the image misalignment amount corresponds to the focusing lens position at the image signal accumulation timing, and is close to the ideal value. On the other hand, 16b shows the relationship between the image misalignment amount of added image signals corresponding to three frames and the focusing lens position at the temporally central time in the accumulation period of the image signals corresponding to the added frames (reference lens position in the addition processing).

A comparison of 16a and 16b shows that with respect to the same reference lens position, the calculated image misalignment amount is smaller in 16b due to the influence of performing frame addition. For example, consider the (n−3)-th frame in which the focusing lens position (which is treated as the reference lens position in the case of not performing frame addition) is 300. In the case of not performing frame addition, the image misalignment amount is 14 [bits]. On the other hand, the center of the accumulation period of the image signals obtained by adding the (n−2) to (n−4)-th frames is the center of the accumulation period for the (n−3)-th frame, and although the reference lens position is 300, the image misalignment amount calculated from the added image signals is 11.49 [bits].

This is because the contribution rate of the added image signal to sharpness increases the higher the contrast is among the added image signals, and therefore the image misalignment amount obtained by the correlation calculation performed on the added image signals approaches the image misalignment amount of high-contrast image signals. In this example, the focusing lens approaches the in-focus position with the elapse of time, and therefore the contrast of the image signals rises as the frame approaches the current frame, and when the image misalignment amount is obtained using the added image signals, the calculated value will be lower than the original value due to the influence of the image misalignment amount of the image signals in the current frame.

Based on this tendency, in the present embodiment, the focusing lens position that represents the focus state of the imaging optical system that corresponds to the accumulation period of multiple addition target frames (i.e., the reference lens position) is calculated according to the ratio of the sharpness of each image signal to the total sharpness of the image signals to be added. Alternatively, the reference lens position that corresponds to the added image signals is calculated by performing weighted addition on the focusing lens positions that correspond to the respective image signals, giving a higher weight the higher the sharpness of the image signal is.

As one example, in the case of adding the image signals from the n-th to (n−2)-th frames, a reference lens position FP[n,n−1,n−2] is obtained for the image signals of the added frames using the following equation. Here, Sharpness[n] is the sharpness of the image signals of the n-th frame.

$$FP[n,n-1,n-2]=(\text{Sharpness}[n] \times FP[n]+\text{Sharpness}[n-1] \times FP[n-1]+\text{Sharpness}[n-2] \times FP[n-2]) \ldots (\text{Sharpness}[n]+\text{Sharpness}[n-1]+\text{Sharpness}[n-2]) \quad (4)$$

The relationship between the reference lens position calculated using Equation 4 and the image misalignment amount in frame addition is shown by 16c in FIG. 16. It can be seen that the relationship between the reference lens position and the image misalignment amount substantially matches 16a in the case of not performing frame addition, and an appropriate reference lens position is obtained for the image misalignment amount obtained from the added image signals.

Returning to FIG. 11, in step S1107 the CPU 121 determines whether or not the imaging optical system is in the in-focus state. Specifically, the CPU 121 calculates the defocus amount at the current time using the relationship between the defocus amount calculated in step S1104, the reference lens position calculated in step S1106, and the current focusing lens position, and determines whether or not the absolute value is less than or equal to a predetermined value. If it was determined that the imaging optical system is not in the in-focus state, the CPU 121 moves to the processing of step S1108 and performs the so-called AF operation of obtaining a focus driving amount as previously described and adjusting the focus state using the focusing drive circuit 126 and the focus actuator 114. Thereafter, or if it was determined in step S1107 that the imaging optical system is in the in-focus state, the CPU 121 ends this processing and moves to the processing of step S1008 in FIG. 10.

In step S1008, the CPU 121 determines whether or not the live-view operation is to be ended. If it was determined that the live-view operation is not to be ended, the CPU 121 returns to the processing of step S1002 and again executes image readout. If it was determined that the live-view operation is to be ended, the CPU 121 ends the image capture operation series.

In this way, a feature of the present embodiment lies in the method of calculating the focus state that corresponds to added image signals when performing focus detection that employs a phase-difference detection method using added image signals obtained by adding multiple frames worth of image signals obtained from signals from pixels for focus-detection arranged in the image sensor. Specifically, the focus state that corresponds to the added image signals is calculated by setting a higher weight for the focus state that corresponds to an image signal the higher the sharpness of that image signal is. This enables realizing favorable focus precision even in the case where focusing lens driving and focus detection are carried out in parallel.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-119212, filed on Jun. 5, 2013, which is hereby incorporated by reference herein its entirety.

What is claimed is:

1. An image capture apparatus comprising:
an image sensor that can acquire image signals to be used for focus detection based on a phase-difference detection; and
at least one processor configured to function as:
an addition unit configured to generate an added image signal by adding a plurality of image signals obtained in a plurality of frames of a moving image captured at a predetermined frame rate;
a calculation unit configured to calculate a defocus amount of an imaging optical system based on the added image signal;
a correction unit configured to correct the defocus amount; and
a drive unit configured to adjust a focal point of the imaging optical system according to the corrected defocus amount,
wherein the correction unit corrects the defocus amount according to a difference between a focus state of the imaging optical system that corresponds to an accumulation period of the plurality of image signals used to generate the added image signal and a focus state of the imaging optical system when the drive unit adjusts the focal point, and
wherein the correction unit calculates the focus state of the imaging optical system that corresponds to the accumulation period of the plurality of image signals used to generate the added image signal by weighting respective focus states of the imaging optical system that correspond to respective accumulation periods of the image signals used to generate the added image signal such that a weight applied to an image signal having a first sharpness is larger than a weight applied to an image signal having a second sharpness being lower than the first sharpness.

2. The image capture apparatus according to claim 1,
wherein the correction unit calculates the focus state of the imaging optical system that corresponds to the accumulation period of the plurality of image signals used to generate the added image signal by weighting respective focus states of the imaging optical system that correspond to respective accumulation periods of the image signals used to generate the added image signal such that the higher a sharpness of the image signal is, the larger the weight is.

3. The image capture apparatus according to claim 1,
wherein the correction unit weights focus states of the imaging optical system that correspond to respective accumulation periods of the image signals used to generate the added image signal such that the higher a ratio of a sharpness of the image signal to a total sharpness of the plurality of image signals is, the larger the weight is.

4. The image capture apparatus according to claim 1,
wherein the number of image signals added by the addition unit to generate the added image signal is determined so that a peak-to-bottom value of the added image signal can exceed a predetermined threshold value.

5. The image capture apparatus according to claim 1,
wherein the image sensor is a CMOS image sensor, and the accumulation period is from an accumulation start time for a first pixel line to an accumulation end time for a last pixel line in a pre-set focus detection region.

6. The image capture apparatus according to claim 1,
wherein a position of a focusing lens of the imaging optical system is used as the focus state of the imaging optical system.

7. A method of controlling an image capture apparatus that has an image sensor that can acquire an image signal using focus detection that employs a phase-difference detection method, comprising:
generating an added image signal by adding a plurality of image signals obtained in a plurality of frames of a moving image captured at a predetermined frame rate;
calculating a defocus amount of an imaging optical system based on the added image signal;
correcting the defocus amount; and
adjusting a focal point of the imaging optical system according to the corrected defocus amount,
wherein in the correcting, the defocus amount is corrected according to a difference between a focus state of the imaging optical system that corresponds to an accumulation period of the plurality of image signals used to generate the added image signal and a focus state of the imaging optical system when the focal point is adjusted in the adjusting, and
wherein in the correcting, the focus state of the imaging optical system that corresponds to the accumulation period of the plurality of image signals used to generate the added image signal is calculated by weighting respective focus states of the imaging optical system that correspond to respective accumulation periods of the image signals used to generate the added image signal such that a weight applied to an image signal having a first sharpness is larger than a weight applied to an image signal having a second sharpness being lower than the first sharpness.

8. A non-transitory computer-readable storage medium that stores a program for causing a computer included in an image capture apparatus to execute a method of controlling an image capture apparatus comprising:
generating an added image signal by adding a plurality of image signals obtained in a plurality of frames of a moving image captured at a predetermined frame rate;
calculating a defocus amount of an imaging optical system based on the added image signal;
correcting the defocus amount and
adjusting a focal point of the imaging optical system according to the corrected defocus amount,
wherein in the correcting, the defocus amount is corrected according to a difference between a focus state of the imaging optical system that corresponds to an accumulation period of the plurality of image signals used to generate the added image signal and a focus state of the imaging optical system when the focal point is adjusted in the adjusting, and
wherein in the correcting, the focus state of the imaging optical system that corresponds to the accumulation period of the plurality of image signals used to generate the added image signal is calculated by weighting respective focus states of the imaging optical system that correspond to respective accumulation periods of the image signals used to generate the added image signal such that a weight applied to an image signal having a first sharpness is larger than a weight applied to an image signal having a second sharpness being lower than the first sharpness.

9. An image capture apparatus comprising:
an image sensor that can acquire image signals to be used for focus detection based on a phase-difference detection; and
at least one processor configured to function as:
an addition unit configured to generate an added image signal by adding a plurality of image signals obtained in a plurality of frames of a moving image captured at a predetermined frame rate;
a calculation unit configured to calculate a defocus amount of an imaging optical system based on the added image signal;
a correction unit configured to correct the defocus amount; and
a drive unit configured to adjust a focal point of the imaging optical system according to the corrected defocus amount,
wherein the correction unit corrects the defocus amount according to a difference between a focus state of the imaging optical system that corresponds to an accumulation period of the plurality of image signals used to generate the added image signal and a focus state of the imaging optical system when the drive unit adjusts the focal point, and
wherein the correction unit weights focus states of the imaging optical system that correspond to respective accumulation periods of the image signals used to generate the added image signal such that a weight applied to an image signal, of which sharpness has a first ratio to a total sharpness of the plurality of image signals, is larger than a weight applied to an image signal, of which sharpness has a second ratio to the total sharpness of the plurality of image signals being lower than the first ratio.

10. The image capture apparatus according to claim 9,
wherein the correction unit calculates the focus state of the imaging optical system that corresponds to the accumulation period of the plurality of image signals used to generate the added image signal by weighting respective focus states of the imaging optical system that correspond to respective accumulation periods of the image signals used to generate the added image signal such that the higher a sharpness of the image signal is, the larger the weight is.

11. The image capture apparatus according to claim 9,
wherein the correction unit weights focus states of the imaging optical system that correspond to respective accumulation periods of the image signals used to generate the added image signal such that the higher a ratio of a sharpness of the image signal to a total sharpness of the plurality of image signals is, the larger the weight is.

12. The image capture apparatus according to claim 9,
wherein the number of image signals added by the addition unit to generate the added image signal is determined so that a peak-to-bottom value of the added image signal can exceed a predetermined threshold value.

13. The image capture apparatus according to claim 9, wherein the image sensor is a CMOS image sensor, and the accumulation period is from an accumulation start time for a first pixel line to an accumulation end time for a last pixel line in a pre-set focus detection region.

14. The image capture apparatus according to claim 9, wherein a position of a focusing lens of the imaging optical system is used as the focus state of the imaging optical system.

15. A method of controlling an image capture apparatus that has an image sensor that can acquire an image signal using focus detection that employs a phase-difference detection method, comprising:

generating an added image signal by adding a plurality of image signals obtained in a plurality of frames of a moving image captured at a predetermined frame rate;

calculating a defocus amount of an imaging optical system based on the added image signal;

correcting the defocus amount; and adjusting a focal point of the imaging optical system according to the corrected defocus amount, wherein in the correcting, the defocus amount is corrected according to a difference between a focus state of the imaging optical system that corresponds to an accumulation period of the plurality of image signals used to generate the added image signal and a focus state of the imaging optical system when the focal point is adjusted in the adjusting, and wherein in the correcting, the focus state of the imaging optical system that corresponds to the accumulation period of the plurality of image signals used to generate the added image signal is calculated by weighting respective focus states of the imaging optical system that correspond to respective accumulation periods of the image signals used to generate the added image signal such that a weight applied to an image signal, of which sharpness has a first ratio to a total sharpness of the plurality of image signals, is larger than a weight applied to an image signal, of which sharpness has a second ratio to the total sharpness of the plurality of image signals being lower than the first ratio.

16. A non-transitory computer-readable storage medium that stores a program for causing a computer included in an image capture apparatus to execute a method of controlling an image capture apparatus comprising:

generating an added image signal by adding a plurality of image signals obtained in a plurality of frames of a moving image captured at a predetermined frame rate;

calculating a defocus amount of an imaging optical system based on the added image signal;

correcting the defocus amount; and adjusting a focal point of the imaging optical system according to the corrected defocus amount, wherein in the correcting, the defocus amount is corrected according to a difference between a focus state of the imaging optical system that corresponds to an accumulation period of the plurality of image signals used to generate the added image signal and a focus state of the imaging optical system when the focal point is adjusted in the adjusting, and wherein in the correcting, the focus state of the imaging optical system that corresponds to the accumulation period of the plurality of image signals used to generate the added image signal is calculated by weighting respective focus states of the imaging optical system that correspond to respective accumulation periods of the image signals used to generate the added image signal such that a weight applied to an image signal, of which sharpness has a first ratio to a total sharpness of the plurality of image signals, is larger than a weight applied to an image signal, of which sharpness has a second ratio to the total sharpness of the plurality of image signals being lower than the first ratio.

* * * * *